Nov. 7, 1967  A. D. SINGLEY ET AL  3,351,252
ATTACHMENT FOR CHAIN-TYPE PIPE CUTTING TOOLS
Filed Oct. 23, 1965  2 Sheets-Sheet 1
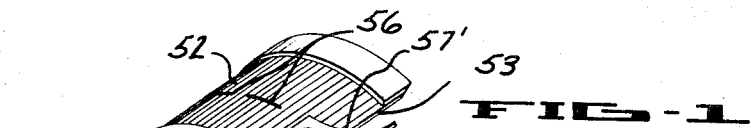
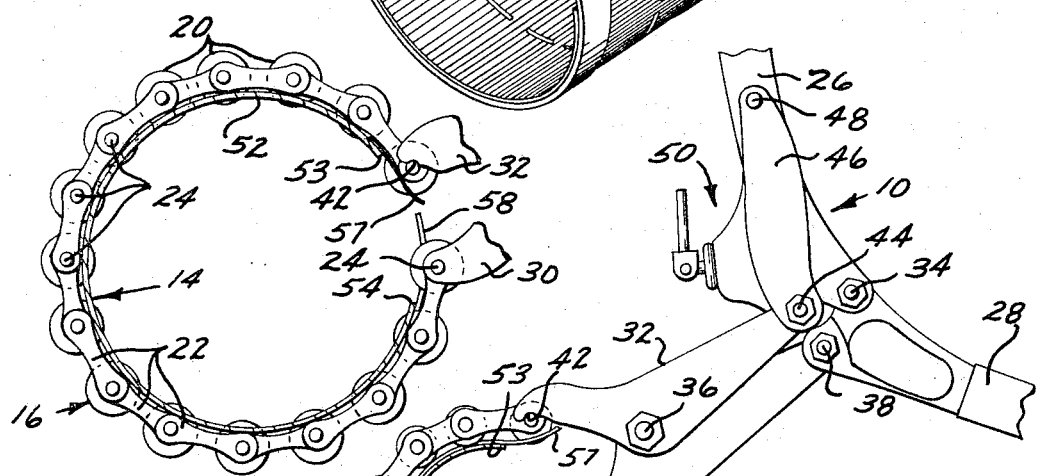
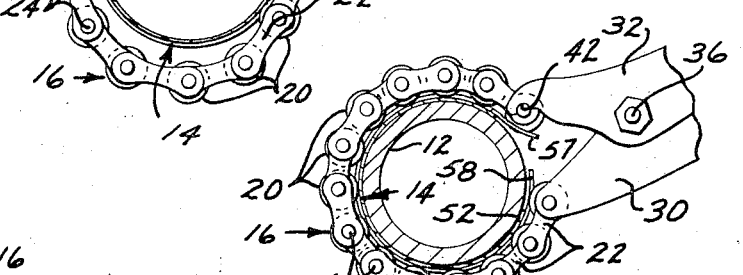
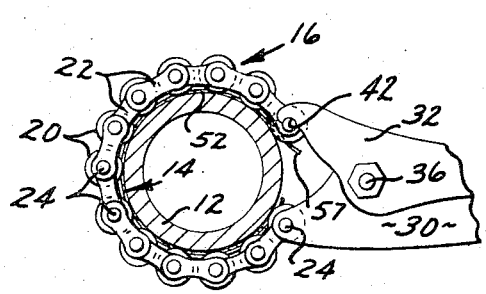
INVENTORS.
ALFRED D. SINGLEY
DAVID J. RAWLINS
BY Fulwider, Patton, Rieber,
Lee & Utecht
ATTORNEYS

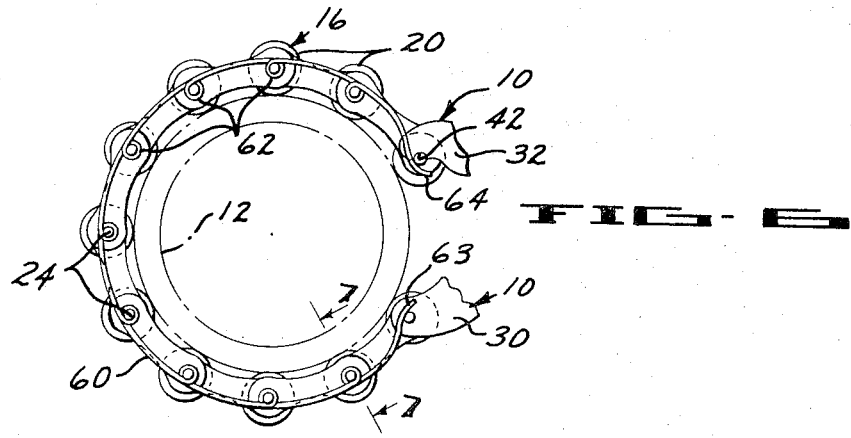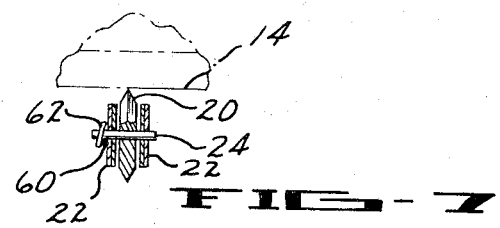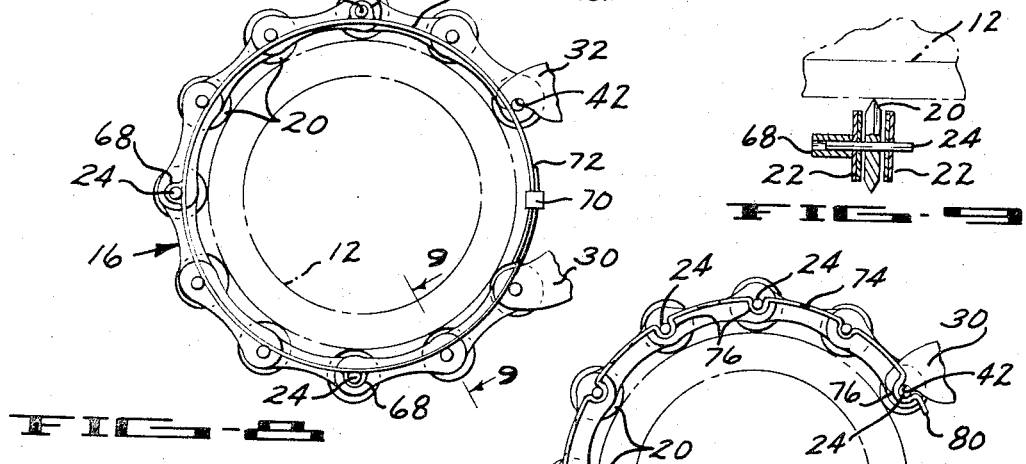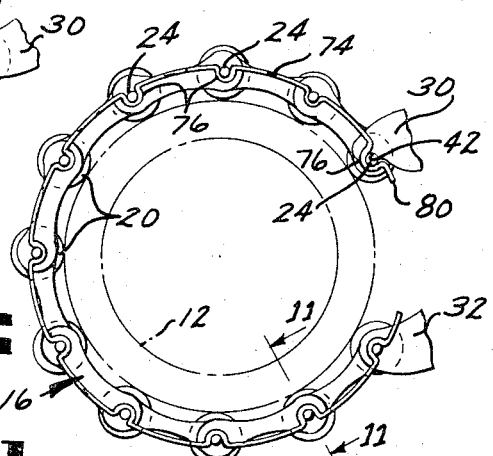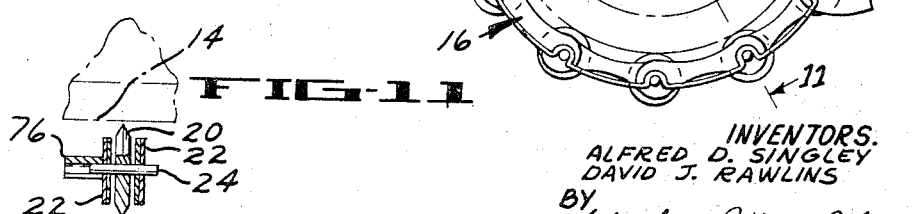

United States Patent Office 3,351,252
Patented Nov. 7, 1967

3,351,252
ATTACHMENT FOR CHAIN-TYPE PIPE CUTTING TOOLS
Alfred D. Singley, 6819 E. San Carlos St., Paramount, Calif. 90723, and David J. Rawlins, Huntington Beach, Calif.; said Rawlins assignor to said Singley
Filed Oct. 23, 1965, Ser. No. 503,593
14 Claims. (Cl. 225—103)

ABSTRACT OF THE DISCLOSURE

An attachment for a chain-type cutting tool for pipe and which comprises an elongated resilient band connected to the cutter chain of the tool for biasing the cutter chain in an open, generally loop-shaped configuration for easy placement upon successive lengths of pipe to be cut.

---

The present invention relates to cutting tools for parting fracturable members, such as cast iron pipe and the like, and, more particularly, to an attachment for chain-type pipe cutting tools.

Over the years, numerous forms of apparatus have been employed to cut cast iron pipe, conduit and other hollow, brittle and fracturable members. One of the more popular forms of such apparatus is the chain-type pipe cutting tool. Conventional chain-type pipe cutting tools operate upon the well recognized principle that hollow articles, especially those formed of relatively brittle materials can readily and accurately be cut by applying substantially uniform, circumferentially distributed and radially directed pressure to the article sufficient to effect cutting thereof. In accordance with this principle, such pipe cutting tools generally include a length of flexible, nonextendable cutter chain, carrying a number of evenly spaced, disk-shaped cutter elements. The cutter chain is adapted to be wrapped around and tension squeezed against pipe to fracture the pipe upon the closing of the jaws of an associated clamp.

Generally, the jaws of the clamp are pivotally connected together at an intermediate point with manually operable handles connected to the rear ends thereof to control the opening and closing of the jaws. The lower jaw is connected to one end of the cutter chain while the other jaw includes a detent adapted to receive a transverse link connecting pin of the chain after wrapping around a pipe. The particular connecting pin received by the detent is of course determined by the size of the pipe being severed by the pipe cutting tool.

To sever a pipe using a conventional chain-type pipe cutting tool, the workman first positions the clamp jaws adjacent the pipe to be cut with the cutter chain extending under the pipe. With the lower jaw immediately adjacent the pipe, the workman then wraps the cutter chain around the pipe and inserts the appropriate connecting pin into the detent. Manual operation of the handles then closes the clamp jaws to cause the cutter chain to sever the pipe.

After the pipe has been severed, the links of the cutter chain collapse and the connecting pin falls from the detent in the upper jaw. Therefore, before cutting another section from the pipe, the workman must repeat the set up operation by again wrapping the cutter chain around the pipe and again connecting the appropriate connecting pin into the detent in the upper jaw. The wrapping of the cutter chain around the pipe and the placement of the proper connecting pin into the detent, is a time consuming and laborious operation. Also, it requires the workman to exercise an appreciable amount of care in selecting the proper connecting pin for engagement with the detent. In this regard, it is very important that the detent engage the proper connecting pin, for if there is any slack in the chain after a closing of the clamp jaws, the pipe will not break. Conversely, if the chain does not encircle the pipe upon a closing of the clamp, then nonuniform radial squeezing forces are exerted on the pipe, and if a break occurs in the pipe, it is usually rough and uneven. In fact, for each different pipe size there is only one proper connecting pin for engaging the detent. Unfortunately, the selection of the proper connecting pin involves a certain amount of guesswork and trial-and-error manipulation of the tool on the part of the workman, and often results in improperly cut or damaged pipe. This is so even though a pipe is being cut into a series of different lengths by the pipe cutting tool, or the pipe cutting tool is being used to repeatedly cut pipe of the same size.

In view of the foregoing, it is an object of the present invention to eliminate the need of wrapping the cutter chain of a chain-type pipe cutting tool around a pipe and connecting the chain to the jaws of the tool after each cutting operation of a given pipe or of pipes of the same size.

Another object of the present invention is to eliminate the guesswork and trial-and-error manipulation associated with the selection of the proper connecting pin of the cutter chain of a chain-type pipe cutting tool for engagement with the upper jaw thereof when a workman is severing a given pipe into different lengths or cutting pipes of the same size.

A further object of the present invention is to provide an attachment for a chain-type pipe cutting tool which maintains the cutter chain thereof in an open, loop-shaped configuration, connected to the jaws of the tool both before and after severing a piece of pipe, and ready to slidably receive the pipe or a pipe of similar size for cutting.

Still another object of the present invention is to provide an attachment of the foregoing type which is simple in design, easy to attach, and inexpensive to manufacture.

The foregoing as well as other objects and advantages of the present invention may be more clearly understood by reference to the following detailed description when taken with the drawings which, by way of example only, illustrate a number of different attachments embodying the features of the present invention.

In the drawings:
FIGURE 1 is a perspective view of one form of the attachment;
FIGURE 2 is a side view showing the cutter chain of a conventional chain-type cutting tool looped around a pipe and the attachment of FIGURE 1 in a compressed state and slipped within the loop of the chain;
FIGURE 3 is an end view similar to FIGURE 2, with the attachment expanded to hold the chain in a generally circular configuration around a pipe with the appropriate connecting pin engaging the detent in the upper jaw of the cutting tool;
FIGURE 4 is a view similar to FIGURE 3 with the clamp jaws closed to sever the pipe;
FIGURE 5 is a side view similar to FIGURE 4 illustrating the attachment connected to the cutter chain after the cutting operation of the pipe has been completed;
FIGURE 6 is a side view illustrating another form of attachment connected to the cutter chain of a chain-type pipe cutting tool;
FIGURE 7 is a sectional view taken along the lines of 7—7 of FIGURE 6;
FIGURE 8 is a side view of another form of attachment connected to the cutter chain of a chain-type pipe cutting tool;
FIGURE 9 is a sectional view taken along the line 9—9 of FIGURE 8;
FIGURE 10 is a side view of still a different form of attachment connected to the cutter chain of a chain-type pipe cutting tool; and FIGURE 11 is a sectional view taken along the line 11—11 in FIGURE 10.

The front portion of a conventional chain-type pipe cutter 10 is illustrated in FIGURE 2 in combination with a pipe 12 to be cut, and one form of the attachment 14 of the present invention. By way of example, the cutting tool 10 is of the type described in detail in the U.S. Patent No. 3,048,920 issued Aug. 14, 1962, to C. J. Wheeler and reference should be made thereto for a detailed understanding of the construction and operation of the cutting tool.

Briefly, however the cutting tool 10 includes a length of flexible, nonextendable cutter chain 16 and a compound leverage type, manually operable clamp 18 for tension squeezing the chain around and against the pipe 12 to sever the pipe upon a closing of the jaws of the clamp.

The cutter chain 16 comprises a plurality of diskshaped cutter elements 20, connecting links 22 between the cutter elements, and transverse connecting pins 24 extending through the cutter elements and connecting links beyond opposite sides thereof.

The clamp 18 includes upper and lower elongated handles 26 and 28 (only partially shown), a lower clamp jaw 30 and a pair of congruent upper clamp jaws 32 spaced evenly on opposite sides of the lower jaw.

The front end portions of the handles 26 and 28 are pivotally connected at a common point by a connecting bolt 34 while the upper and lower clamp jaws 32 and 30 are pivotally connected at a common point intermediate their front and rear ends by a connecting bolt 36. The rear end of the lower jaw 30 is pivotally secured to the end portion of a lower handle 28 by a connecting pin 38 while the front end is bifurcated to receive a cutter element 20 with a transverse connecting pin 24 pivotally securing one end of the cutter chain 16 to the front end. The rear ends of the upper jaws 32 are pivotally connected by a bolt 44 to the front end of a pair of connecting arms 46 which are in turn pivotally secured to the main body of the upper handle 26 by a connecting pin 48.

The front ends of the upper jaws 32, on the other hand, include aligned detents 42 for releasably engaging and receiving the opposite end portions of a particular connecting pin 24 of the cutter chain 16, after the chain has been wrapped around the pipe 12. The particular connecting pin 24 is determined by the size of the pipe and is the particular pin which allows the chain to encircle the pipe and upon a closing of the clamp jaws to develop uniform, radial pipe-breaking pressure on the pipe.

The clamp 18 also includes a fine adjustment assembly 50 to control the space between the upper and lower jaws with the clamp open.

In general, the attachment 14 is designed to spring bias the cutter chain 16 into a generally circular, oval or open, loop-shaped configuration and to maintain the chain connected to the upper and lower jaws 32 and 30 of the tool 10, both before and after severing the pipe 12, ready to slidably receive the pipe 12 or a pipe of the same size. In this manner, the attachment 14 eliminates the need for wrapping the cutter chain 16 around the pipe 12 and connecting the chain to the upper jaw 32 within the detents 42 after each cutting operation of the pipe 12, or a pipe of the same size, reduces to a minimum the physical labor of the workman operating the tool 10, eliminates the trail-and-error manipulation and guesswork associated with the selection of the proper connecting pin for engagement with the detents, and allows the workman to easily, rapidly and reliably sever the pipe 12 or similar size pipes into different lengths.

Referring more particularly to FIGURE 1, there is illustrated a preferred form of the attachment 14. As represented, the attachment 14 comprises a length of substantially, nonextendable, resilient, pierceable material, preferably a lightweight, transversely corrugated metal. The material is formed into a generally circular band 52 with opposite ends 53 and 54 adjacent each other and defining an opening 55 in the circular configuration. The integral, transverse ribs in the corrugated metal strengthen the band 52 against transverse bending and transversely reinforce the edges of a plurality of evenly spaced, circumferential slits 56 formed in the band. The slits 56 may be preformed in the band, or they may be formed during the initial cutting operation of the chain-type pipe cutting tool using the attachment 14. In each case, and as will be described in greater detail hereinafter, the slits 56 are adapted to receive the innermost edge portions of the cutting elements 20 of the chain 16 when the chain is looped between the jaws 30 and 32. The attachment 14 is thereby secured to the chain, and spring urges the chain in a generally circular, oval or open, loop-shaped configuration, depending upon the original shape of the band 52.

In addition to the band 52, the preferred form of the attachment 14 includes a leaf spring 57 and a pair of reinforcing strips 58 connected to an extending along opposite marginal edges of the band 52.

The leaf spring 57 comprises a length of resilient metal connected at one end, as by spot-welding, to the outside of the band 52 adjacent the end 53, with an opposite end extending outwardly away from the band and beyond the end 53. As will be described in greater detail, the leaf spring 57 is adapted to act as a retaining member for the connecting pin 24 within the detents 42, maintaining the connecting pin in the detent after the cutting of a piece of pipe with the chain-type pipe cutting tool employing the attachment 14.

The strips 58 are formed of resilient material, preferably a metal, provide reinforcing strength for the band 52, and facilitate outward springing of the band. If desired, however, the strips 58 may be eliminated when the band 52 is made of sufficiently heavy gauge to spring outwardly in a satisfactory manner. As illustrated most clearly in FIGURE 1, the reinforcing strips 58 preferably extend circumferentially beyond the end 54 of the band toward the end 53. As will be described, this allows the cutting elements 20 connected to the jaws 30 and 32 to ride over the pipe being cut to facilitate cutting of the pipe.

More particularly, to cut the circular pipe 12 using the tool 10 with the attachment 14, the jaws 30 and 32 of the tool 10 are first opened wide, by moving the handles 26 and 28 away from each other, and the chain 16 looped between the jaws with the appropriate connecting pin 24 introduced into the detents 42. The chain 16 is then manually held in place while the attachment 14 is radially compressed, fitted within the loop of the chain (see FIGURE 2), and allowed to expand to engage the cutter elements 20. As the attachment 14 expands, the innermost portion of the cutter element 20 including the connecting pin 24 in the detents 42 passes through a slit 57' in the leaf spring 57. The leaf spring 57 then presses against the cutter element to hold the connecting pin in place in the detents (see FIGURE 5). If the slits 56 are preformed in the band 52, the innermost edge portions of the cutter elements 20 fit into the slits. Otherwise, the innermost edge portions of the cutter elements 20 rest on spaced portions of the band 52. In either case, the band 52 springs outwardly to urge the chain 16 to a generally circular, open-loop configuration. It should be noted that if the pipe 12 were oval rather than circular, then the band 52 would be constructed to have an oval shape and when in place around the pipe would urge the chain to an oval loop.

With the chain 16 held in the open-loop configuration by the band 52, and the leaf spring 57 holding the proper connecting pin 24 in the detents 42, the pipe 12 is slipped into the loop and held in place (see FIGURE 3). The handles 26 and 28 are then operated to close the clamp 18 thereby causing the cutter chain 16 to exert a uniform, radially directed pressure on the pipe 12, severing the pipe along the line of the cutter elements 20 carried by the chain (see FIGURE 4).

If the slits 56 are preformed in the band 52, then during the cutting operation the innermost surfaces of the cutter elements press directly upon the pipe 12. If the slits are not included in the band 52 prior to cutting, then during the first cutting operation, the cutter elements 20 are initially forced tightly against the band, piercing the band at spaced intervals conforming to the slits 56. The innermost portions of the cutter elements 20 then engage the outer surface of the pipe 12 and sever the pipe in the manner previously described. As the pipe is severed, the innermost portions of the cutter elements pass further through the band 52 to tightly attach the band to the cutter chain 16 (see FIGURE 5).

In either case, during the cutting of the pipe 12, the cutter elements 20 connected to the jaws 30 and 32 pass through the opening 55 in the band and directly engage the outer surfaces of the pipe. As the clamp 18 is closed and the chain 16 tightened about the pipe 12, the cutting elements 20 connected to the jaws 30 and 32 ride directly over the pipe. This makes for easier cutting of the pipe than would occur if the cutter elements connected to the jaws were to ride over the corrugated band 52 as the clamp 18 closed. Also, during the closing of the jaws, if there is any overlap of the ends of the attachment 14, only the portions of the reinforcing strips 58 ride over the opposite extremities of the band 52 and produce much less friction than if one extremity of the band were to ride over the other.

After the pipe 12 has been severed the band 52 continues to exert an outward spring force on the cutter chain 16. This prevents the links of the chain from collapsing and maintains the chain in a generally circular configuration while the leaf spring 57 retains the connecting pin 24 within the detents 42 in the upper jaws 32. As previously noted, if the pipe 12 is other than circular, the attachment is constructed to urge the chain to a correspondingly shaped loop around the pipe. Thus, once the clamp 18 is again opened, the cutter chain 16 is in an open, loop-shaped configuration, ready to slidably receive the pipe 12, or a different pipe of the same size and shape, to accurately, reliably and quickly sever the pipe upon a reclosing of the clamp 18. In this manner, the band 52 eliminates the need for rewrapping the cutter chain 16 around the pipe and the guesswork and manipulation associated with the positioning of the proper connecting pin within the detents to insure an accurate and clean cutting of the pipe.

An alternate form of the attachment 14 possessing the foregoing features and advantages is illustrated in FIGURES 6 and 7. As shown, the alternate form of the attachment comprises an elongated, non-extendable, length of metal spring wire 60 having a series of spaced loops 62 therein and opposite end portions 63 and 64 adapted to extend or contact with and beyond the cutter elements 20 connected to the jaws 30 and 32. The loops are spaced from each other to tightly receive consecutive connecting pins 24 of the cutter chain 16.

In use, the spring wire 60 is connected to the cutter chain 16 by inserting the connecting pins 24 through the loops 62 (see FIGURE 7) with the end portion 63 extending over the cutter element 20 connected to the jaw 30 as illustrated in FIGURE 6. Next, the cutter chain is looped between the jaws 30 and 32, the appropriate connecting pin 24 introduced into the detents 42 of the upper jaws 32, and the opposite end portion 64 of the wire positioned over the cutter elements connected to the jaws 32 to retain and hold the associated pin 24 in the detents. Thus connected, the wire 60 springs outwardly to urge the chain 16 into a circular loop configuration.

With the chain 16 held in the looped configuration, the pipe 12 is slipped within the loop and the tool 10 operated as previously described to sever the pipe.

After the pipe has been severed, the spring wire 60 continues to urge the links of the cutter chain 16 outwardly to maintain the cutter chain in the generally circular, open-loop configuration and the end portion 64 retains the appropriate connecting pin still within the detents 42. The cutter chain 16 is thus adapted to again slidably receive the pipe 12, or a similar size pipe, and the cutting operation may be reliably and quickly repeated without requiring a rewrapping of the chain 16 around the pipe or a reinsertion of the appropriate connecting pin into the detents.

Another form of the attachment 14 is illustrated in FIGURES 8 and 9 and comprises a relatively narrow band 66 of nonextendable, resilient material, preferably a metal. Three loops 68 are connected to a common side of the band 66 at evenly spaced intervals and are each adapted to receive a different connecting pin 24 of the cutter chain 16. One end of the band carries an open loop catch 70 for slidably receiving an opposite end 72 of the band when the band is formed into a circle. The catch 70 allows the circle to be expanded or contracted as desired.

In use, the cutter chain 16 is first looped between the jaws 30 and 32 of the tool 10 with the appropriate connecting pin 24 introduced into the detents 42 in the upper jaws 32. The band 66 is then adjusted to generally conform in size to the circle to be formed by the cutter chain, and the band is connected to the cutter chain by slipping the connecting pins 24 into the loops 68 (see FIGURE 9). In this position the portion of the band 66 adjacent the jaws 32 retain the pin 24 within the detents 42. The pipe is then slipped into the loop of the chain 16 and the previously described operation of the cutting tool 10 followed to sever the pipe.

During the severing operation, the circle formed by the band 66 contracts slightly and the end of the end 72 of the band slides within the loop of the catch 70. After the cutting operation, the resilient band 66 returns to its original circular form and exerts radial forces on the links of the chain 16 which maintain the chain in a generally circular configuration ready to again slidably receive the pipe 12 or another pipe of the same size.

Still another form of the attachment 14 is illustrated in FIGURES 10 and 11 as comprising a relatively narrow band 74 of nonextendable, resilient material having a plurality of spaced, laterally extending open loops 76 formed thereby, and an end portion 80 adapted to extend in contact with and beyond the connecting pin 24 in the detents 42 to hold the pin in place. The spacing of the loops 76 conforms to the spacing between adjacent connecting pins 24 of the cutter chain 16 and the loops are adapted to snap over the connecting pins outside the links (see FIGURE 11).

In use, the band 74 is attached to the cutter chain 16 by snapping the connecting pins 24 into the loops 76 with the loops facing in an outward direction relative to the pipe 12. The cutter chain 16 is then looped between the jaws 30 and 32 in the usual manner and the appropriate connecting pin 24 introduced into the detents 42 to ready the cutting tool 10 for operation.

The actual cutting operation of the tool 10 is as before. After cutting, the band 74 springs outwardly and maintains the chain 16 in a generally circular configuration with the appropriate connecting pin 24 within the detents 42 ready to again receive the pipe 12 or a pipe of similar size.

From the foregoing, it is appreciated that the present invention provides an attachment for a chain-type pipe cutting tool which maintains the cutter chain thereof in a generally circular, oval or other suitable loop configuration with a connecting pin within the detents of the jaw of the cutter both before and after the severing of the pipe. In this manner, the attachment eliminates the need for rewrapping the chain around the pipe for each successive cut and the need for repositioning the proper connecting pin within the detents. Furthermore, it is appreciated that the attachment of the present invention is simple in design, easy to attach, and relatively inexpensive to manufacture.

While particular forms of the attachments have been described in some detail herein, changes and modifications may be made in the illustrated forms without departing from the spirit of the present invention. Also, the attachments have been described in connection with a chain-type pipe cutting tool 10 wherein it is necessary to wrap the cutter chain 16 around the pipe to be cut. It is to be noted however, that the attachments are equally useful with pipe cutting tools wherein the cutter chain is permanently connected to the jaws 30 and 32 and adapted to cut a single size of pipe. Alternatively, rather than including the leaf spring 57, or the like, on the attachment 14, a clip or other device may be included on the jaws 32 to releasably secure the connecting pin 24 in the detents 42. Further, the jaws of the cutting tool may be opened and closed by hydraulic as well as manual means. It is therefore intended that the present invention be limited in scope only by the terms of the following claims.

We claim:

1. An attachment for a chain-type cutting tool, comprising:
    an elongated, bendable, yet substantially nonextendable, resilient element;
    and means on said element for connecting said element at spaced intervals to the cutter chain of a chain-type pipe cutting tool to spring urge and maintain said chain in an open, generally loopshaped configuration when connected to the jaws of said tool.

2. An attachment for a chain-type pipe cutting tool having a pair of jaws one of which is releasably connected to a portion of the cutter chain of the tool, said attachment comprising:
    an open, generally loop-shaped band of substantially nonextendable, resilient material pierceable by the cutter elements of the cutter chain to connect said band to said chain and thereby maintain said chain in an open, loop-shaped configuration after severing a pipe; and means on said band for retaining said portion of said cutter chain connected to said one jaw after a severing of said pipe.

3. An attachment for a chain-type pipe cutting tool, comprising:
    an open, generally loop-shaped band of substantially nonextendable, resilient material having opposite ends adjacent each other and a plurality of spaced circumferential slits cut therein to receive the cutter elements of the cutter chain of a chain-type pipe cutting tool to connect said band to said chain and thereby maintain the chain in an open, generally loop-shaped configuration when connected to the jaws of said tool.

4. The attachment of claim 3, wherein said band is formed of a transversely corrugated metal.

5. The attachment of claim 3, wherein said tool includes a pair of jaws, one for releasably holding a portion of said chain and wherein said attachment includes means on said band for retaining said portion of said cutter chain connected to said one jaw after a severing of said pipe.

6. An attachment for a chain-type pipe cutting tool having a pair of jaws one of which is releasably connected to a portion of the cutter chain of the tool, said attachment comprising:
    an open, generally loop-shaped main band of substantially nonextendable, resilient material pierceable by the cutter elements of the cutter chain to connect said band to said chain and thereby maintain said chain in an open, loop-shaped configuration when connected to the jaws of said tool;
    relatively narrow reinforcing bands along the marginal edges of said main band; and means on said band for retaining said portion of said cutter chain connected to said one jaw.

7. An attachment for a chain-type pipe cutting tool, comprising:
    an elongated, bendable, yet substantially nonextendable, resilient element;
    and a plurality of spaced loops in said element for receiving the ends of transverse connecting pins of the cutter chain of a chain-type pipe cutting tool to connect said element to said chain to spring urge and maintain said chain in an open, generally loop-shaped configuration when connected to the jaws of said tool.

8. The attachment of claim 7 wherein one of said jaws releasably holds a portion of said chain and wherein said attachment includes means at one end of said resilient member for retaining said portion of said cutter chain connected to said one jaw.

9. An attachment for a chain-type pipe cutting tool, comprising:
    a length of substantially nonextendable, resilient spring wire including a series of spaced loops for receiving the ends of transverse connecting pins of a cutter chain of a chain-type pipe cutting tool to connect said spring wire to said chain to spring urge and maintain said chain in an open, generally loop-shaped configuration when connected to the jaws of said tool.

10. The attachment of claim 9, wherein opposite ends of said spring wire are adapted to extend over and in contact with the jaws of said tool.

11. An attachment for a chain-type pipe cutting tool, comprising:
    an elongated strip of bendable, yet substantially nonextendable, resilient material;
    and a plurality of spaced loops carried by said strip for receiving the ends of transverse connecting pins of the cutter chain of a chain-type pipe cutting tool to connect said strip to said chain to spring urge and maintain said chain in a loop-shaped configuration when connected to the jaws of said tool.

12. The attachment of claim 11, including a catch on one end of said strip for slidably receiving an opposite end of said strip.

13. An attachment for a chain-type pipe cutting tool, comprising:
    an elongated, bendable, yet substantially nonextendable, resilient element including a plurality of spaced, laterally extending open loops for snapping over transverse connecting pins of the cutter chain of a chain-type pipe cutting tool to spring urge and maintain said chain in an open, loop-shaped configuration when connected to the jaws of said tool.

14. The attachment of claim 13 wherein opposite ends of said resilient element are adapted to engage said jaws of said tool.

References Cited
UNITED STATES PATENTS

| | | | |
|---|---|---|---|
| 1,442,720 | 1/1923 | Gilman | 24—256 X |
| 2,747,739 | 5/1956 | Bissonnette | 24—256 X |
| 2,851,773 | 9/1958 | Jennison | 225—103 X |
| 3,048,920 | 8/1962 | Wheeler | 225—103 |

WILLIAM W. DYER, Jr., *Primary Examiner.*

JAMES M. MEISTER, *Examiner.*